(12) United States Patent
Descheemaecker et al.

(10) Patent No.: US 12,527,702 B2
(45) Date of Patent: Jan. 20, 2026

(54) ABSORBENT CORE FOR AN ABSORBENT ARTICLE

(71) Applicants: ONTEX BV, Buggnehout (BE); ONTEX GROUP NV, Erembodegem (BE)

(72) Inventors: Evan Descheemaecker, Zomergem (BE); Karen Roets, De Pinte (BE); Danny Zwanckaert, Maldegem (BE)

(73) Assignees: ONTEX BV, Buggenhout (BE); ONTEX GROUP NV, Erembodegem (BE)

(*) Notice: Subject to any disclaimer, the term of this patent is extended or adjusted under 35 U.S.C. 154(b) by 1899 days.

(21) Appl. No.: 16/313,414

(22) PCT Filed: Mar. 14, 2018

(86) PCT No.: PCT/EP2018/056389
§ 371 (c)(1),
(2) Date: Dec. 26, 2018

(87) PCT Pub. No.: WO2018/167146
PCT Pub. Date: Sep. 20, 2018

(65) Prior Publication Data
US 2019/0159946 A1  May 30, 2019

(30) Foreign Application Priority Data

Mar. 14, 2017 (EP) ..................... 17160763
Sep. 27, 2017 (BE) .................... 2017/0131

(51) Int. Cl.
*A61F 13/532* (2006.01)
*A61F 13/00* (2024.01)
(Continued)

(52) U.S. Cl.
CPC .... *A61F 13/5323* (2013.01); *A61F 13/15626* (2013.01); *A61F 13/1565* (2013.01);
(Continued)

(58) Field of Classification Search
CPC ...... A61F 13/5323; A61F 2013/530868; A61F 2013/53031; A61F 13/53;
(Continued)

(56) References Cited

U.S. PATENT DOCUMENTS 3,430,630 A    3/1969  Stanley et al.
4,834,735 A *  5/1989  Alemany .............. A61F 13/533
                                                    428/218
(Continued)

FOREIGN PATENT DOCUMENTS

DE    4437992 A1   5/1996
EP    1077052 A1   2/2001
(Continued)

OTHER PUBLICATIONS

International Search Report and Written Opinion for PCT/EP2018/056389; Mailed Apr. 17, 2018.

*Primary Examiner* — Michele Kidwell
(74) *Attorney, Agent, or Firm* — VIVICAR Law, PLLC

(57) ABSTRACT

An absorbent core for an absorbent article is provided an absorbent material, the absorbent core comprising one or more first zones comprising a first amount of absorbent material and one or more second zones comprising a second amount of absorbent material, wherein each second zone is at least partly delimited from the other second zones by the one or more first zones characterized in that the first amount of bulk absorbent material is different than the second amount of absorbent material, each amount of absorbent material being determined as weight per unit area.

15 Claims, 4 Drawing Sheets

(51) Int. Cl.
*A61F 13/15* (2006.01)
*A61F 13/36* (2006.01)
*A61F 13/47* (2006.01)
*A61F 13/496* (2006.01)
*A61F 13/53* (2006.01)
*A61F 13/534* (2006.01)

(52) U.S. Cl.
CPC .. *A61F 13/15658* (2013.01); *A61F 13/15682* (2013.01); *A61F 13/15699* (2013.01); *A61F 13/36* (2013.01); *A61F 13/496* (2013.01); *A61F 13/53409* (2013.01); *A61F 2013/00089* (2013.01); *A61F 2013/15715* (2013.01); *A61F 2013/4708* (2013.01); *A61F 2013/530868* (2013.01)

(58) Field of Classification Search
CPC .. A61F 2013/5307; A61F 2013/530708; A61F 2013/530883; A61F 2013/530875; A61F 13/532; A61F 13/534; A61F 13/535
See application file for complete search history.

(56) References Cited

U.S. PATENT DOCUMENTS

| | | | |
|---|---|---|---|
| 5,397,316 A * | 3/1995 | LaVon | A61F 13/535 604/382 |
| 5,756,039 A | 5/1998 | Mcfall et al. | |
| 6,406,648 B1 | 6/2002 | Noel et al. | |
| 6,503,233 B1 | 1/2003 | Chen et al. | |
| 2006/0105075 A1 | 5/2006 | Otsubo | |
| 2006/0184150 A1 | 8/2006 | Noel | |
| 2010/0004614 A1 * | 1/2010 | Ashton | A61F 13/5323 427/2.3 |
| 2010/0032858 A1 * | 2/2010 | de Carvalho | A61F 13/15658 264/101 |
| 2012/0059342 A1 * | 3/2012 | Kinoshita | A61F 13/4753 604/378 |
| 2013/0158494 A1 * | 6/2013 | Ong | A61F 13/53 604/367 |
| 2015/0238369 A1 | 8/2015 | Kaiser et al. | |
| 2016/0136011 A1 | 5/2016 | Peri et al. | |

FOREIGN PATENT DOCUMENTS

| | | |
|---|---|---|
| EP | 1078617 A2 | 2/2001 |
| EP | 1088536 A2 | 4/2001 |
| EP | 1267775 B1 | 9/2004 |
| EP | 1349524 B1 | 1/2010 |
| EP | 2211808 B1 | 10/2012 |
| EP | 1959903 B1 | 2/2014 |
| EP | 2859868 A1 | 4/2015 |
| EP | 3342386 A1 | 7/2018 |
| EP | 3473226 A1 | 4/2019 |
| WO | 2007122525 A1 | 11/2007 |
| WO | 2012090508 A1 | 7/2012 |
| WO | 2017171777 A1 | 10/2017 |
| WO | 2018122117 A1 | 7/2018 |

* cited by examiner

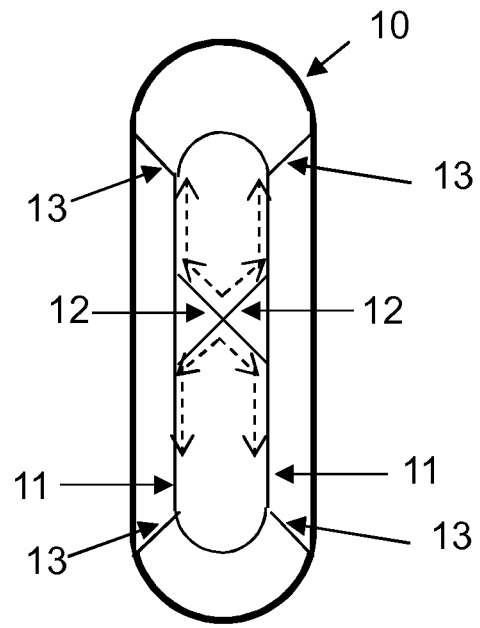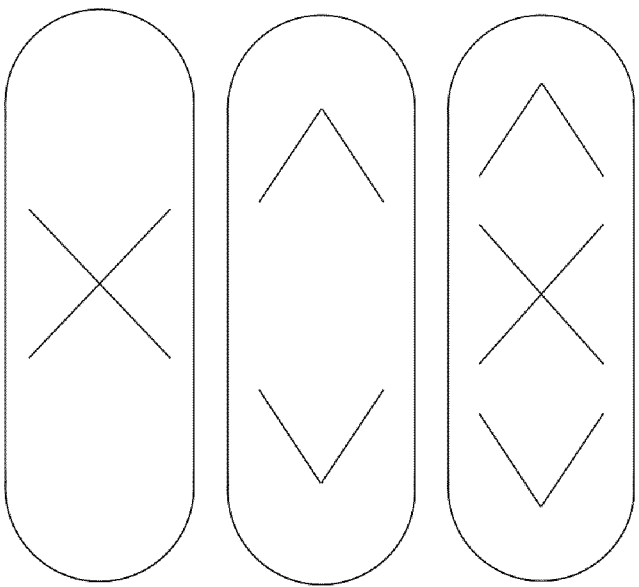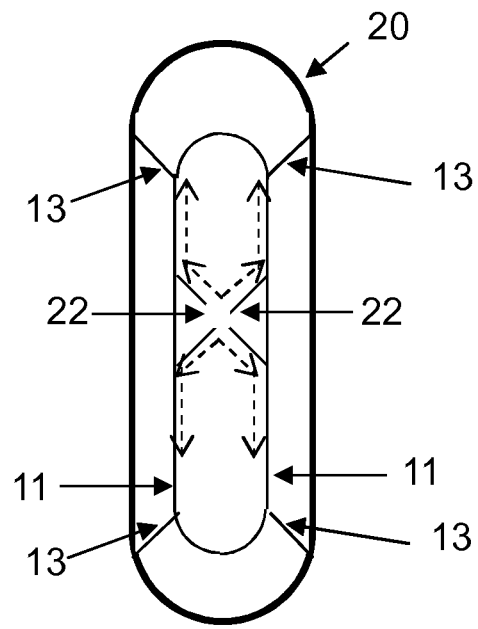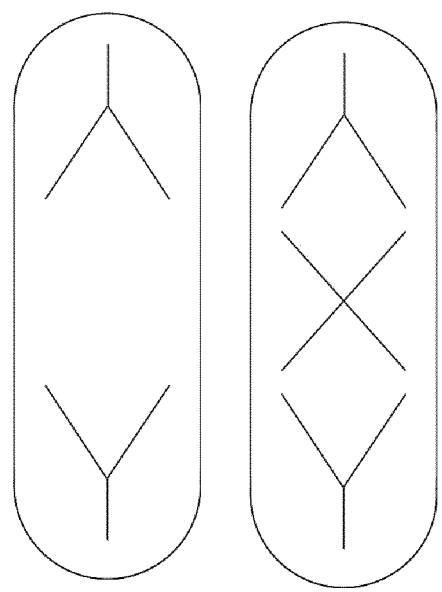
Fig. 1
Fig. 5a  Fig. 5b  Fig. 5c
Fig. 2
Fig. 5d  Fig. 5e

ABSORBENT CORE FOR AN ABSORBENT ARTICLE

CROSS-REFERENCE TO RELATED APPLICATIONS

This application is the national stage application of corresponding international application number PCT/EP2018/056389, filed Mar. 14, 2018, which claims priority to and the benefit of European application no. 17160763.3, filed Mar. 14, 2017 and Belgian application no. BE2017/0131, filed Sep. 27, 2017, all of which are hereby incorporated by reference in their entirety.

The invention pertains to an absorbent core for an absorbent article, in particular for hygiene articles, to absorbent articles comprising said absorbent core and to processes for providing said absorbent core.

One element that contributes to the performance of an absorbent article is the way the absorbent article withstands deformation when in use. The thighs of an individual exert lateral forces on an absorbent article when the absorbent article is positioned between the legs of an individual for use. The lateral forces result in bunching of the absorbent article, affecting the efficiency of the absorbent article's ability to collect bodily fluids since there is a reduction in the absorbent article's surface area being in direct contact with the body. There have been many developments seeking to improve the capability of the absorbent article to conform to the human body, i.e. to have improved body fit.

EP 1077052 A1 and EP 1078617 A2 disclose a sanitary napkin allowing controlled deformation in response to lateral compression when in use. The sanitary napkin has preferential bending zones extending along a longitudinal axis formed by a process of perforating, slitting, cutting or embossing.

EP 1959903 B1 discloses an incontinence pad comprising a pair of folding lines dividing the absorbent core material into a central portion and a pair of longitudinal side portions to adapt better to the body of the user. The folding lines are formed by compression of the absorbent material.

EP 2211808 B1 discloses an absorbent core comprising an upper absorbent core and a lower absorbent core. The upper absorbent core comprises fold indications enabling the absorbent core to adopt a predetermined three-dimensional shape when subjected to pressure in the width direction. The fold indications are cuts or compression lines which do or do not extend completely through the upper core.

EP 1349524 B1 discloses a pantiliner comprising at least one fold line defining a central area and two side areas which allows adjusting the size of the pantiliner by folding the pantiliner along the fold line. The fold lines are lines of embossing.

EP 1267775 B1 discloses a sanitary pad that conforms to the body confinements. The sanitary pad comprises a forward wide portion and a rear narrow portion and at least two fold lines preformed on the upper or lower surface of the narrow portion. The fold lines may be selected from mechanically pressed lines, chemically joined constituents forming the lines, heat generated lines, laser generated lines, adhesive generated lines and/or mechanical vibration generated lines.

EP1088536 A2 discloses a hygiene napkin provided with corrugations making it possible to adapt the hygienic napkin to the user's panties.

U.S. Pat. No. 5,756,039 A discloses an absorbent core comprising distinct segments which can be independently displaced by a lifting member. The lifting member ensures that the top sheet conforms to the wearer's body.

US 2006/0184150 A1 discloses an absorbent core with varying flexibility that act as shaping element for improved body fit. The absorbent core can have lines of reduced bending resistance which are formed by removal of material, e.g. in the form of apertures or slots.

U.S. Pat. No. 6,503,233 B1 discloses an absorbent article comprising a combination of downwardly-deflecting crease lines and an upward-deflecting shaping line to achieve a geometry for improved body fit. The crease lines are formed by embossing of the absorbent material. The shaping line is formed by perforation or notching.

US 2015/0238369 A1 discloses an absorbent core comprising a low density zone surrounded by zones having higher density, the low density zone being lower in density and lower in basis weight as compared to other portions of the absorbent core.

US 2010/0004614 A1 discloses a disposable absorbent article comprising absorbent particulate polymer material having a basis weight that varies across the absorbent core. The absorbent particulate polymer material is deposited on a substrate using a printing system in small and large clusters to form a grid pattern of land areas and junction areas, wherein the small clusters of absorbent particulate polymer material may be thinner than the large clusters of absorbent particulate polymer material. The land areas and junction areas may have circular, oval, square, rectangular or triangular shape.

US 2016/0136011 A1 discloses an absorbent article comprising a distribution material comprising a wetlaid, three-dimensional fibrous substrate comprising a continuous network region and a plurality of discrete zones that are dispersed throughout the continuous network region. The continuous network region may be raised or indented, and may have higher or lower density, relative to the discrete zones. The wetlaid, three-dimensional fibrous substrate may be made using a patterned papermaking belt.

US 2010/0032858 A1 discloses an absorbent article having an absorbent core having second region and a plurality of first regions being arranged in spaced relationship from each of the other first regions and each of the other first regions being entirely surrounded by the second region, the basis weight of the first regions being less than the basis weight of the second region. The absorbent core is made by introducing fibrous pulp into a mould comprising a plurality of nonporous projections having the shape of the first regions.

DE 4437992 A1 discloses a hygiene product comprising a fibrous absorbent core having areas of increased density extending perpendicular to the longitudinal axis, the increased density being obtained by compression.

However, there remains a need to further improve the body fit of absorbent articles to improve the comfort for the individual using the absorbent article.

Another element that contributes to the performance of an absorbent article is the ability to distribute a fluid, which is to be absorbed by the absorbent core, as quickly as possible through the absorbent core to avoid, or at least to reduce, a sense of a wet feeling to the individual using the absorbent article.

There remains a need to further improve the distribution of the fluid throughout the absorbent core.

The object of the invention is to provide an absorbent core for an absorbent article having improved body fit and/or improved fluid distribution.

The object is obtained with the absorbent core according to claim 1 or claim 2. These are indeed alternative solutions to the specific problem of improving body fit and/or fluid distribution.

BRIEF DESCRIPTION OF THE SEVERAL VIEWS OF THE DRAWINGS

FIG. 1 schematically depicts an exemplary mould cavity comprising a shaping profile member.

FIG. 2 schematically depicts another exemplary mould cavity comprising a shaping profile member.

FIG. 5a schematically shows an exemplary mould cavity with a shaping profile member.

FIG. 5b schematically shows another exemplary mould cavity with a shaping profile member.

FIG. 5c schematically shows another exemplary mould cavity with a shaping profile member that combines both the strands of FIGS. 5a and 5b.

FIG. 5d schematically shows another exemplary mould cavity with a shaping profile member.

FIG. 5e schematically shows another exemplary mould cavity with a shaping profile member that combines both the strands of FIGS. 5a and 5d.

Figure 3A:
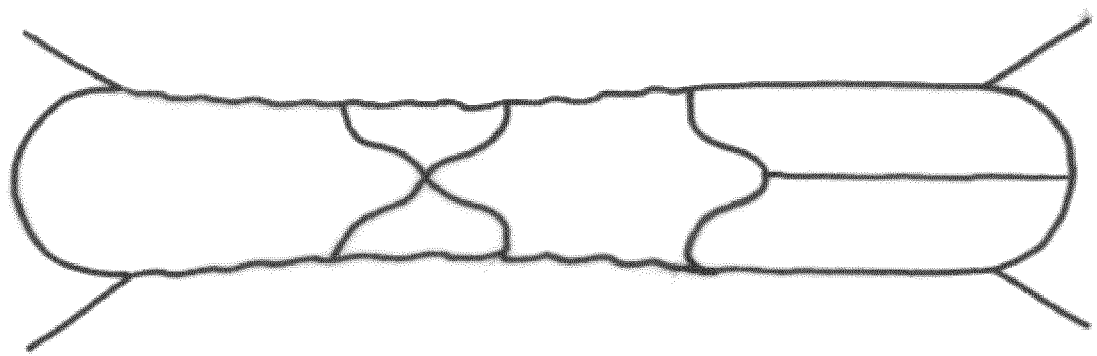
FIG. 3a illustrates an exemplary insert.

In a first embodiment, an absorbent core for an absorbent article is provided comprising an absorbent material, the absorbent core comprising one or more first zones comprising a first amount of absorbent material and one or more second zones comprising a second amount of absorbent material, wherein each second zone is at least partly delimited from the other second zones by the one or more first zones wherein the first amount of absorbent material is different than the second amount of absorbent material, each amount of absorbent material being determined as weight per unit area, wherein the one or more second zones form a pattern which is symmetrical with respect to a central longitudinal axis of the absorbent core, wherein the absorbent core comprises two end portions and a central portion therebetween extending parallel to the central longitudinal axis of the absorbent core, and wherein at least two second zones converge to one point proximal to at least one end portion such to form at least one v-shaped end.

In a second, alternative, embodiment, an absorbent core for an absorbent article is provided comprising an absorbent material, the absorbent core comprising one or more first zones comprising a first amount of absorbent material and one or more second zones comprising a second amount of absorbent material, wherein each second zone is at least partly delimited from the other second zones by the one or more first zones wherein the first amount of absorbent material is different than the second amount of absorbent material, each amount of absorbent material being determined as weight per unit area, wherein the one or more second zones form a pattern which is symmetrical with respect to a central longitudinal axis of the absorbent core, wherein the absorbent core comprises two end portions and a central portion therebetween extending parallel to the central longitudinal axis of the absorbent core, and wherein at least two second zones cross each other at a point of the central portion of the absorbent core.

In an embodiment, these first and second embodiments may be combined to further enhance body fit and/or fluid distribution.

In an embodiment, the ratio of the second amount of absorbent material within a second zone to the first amount of absorbent material within neighbouring one or more first zones in the absorbent core is between 0 and 1, preferably from 0.05 to 0.80, more preferably from 0.10 to 0.70, even more preferably from 0.15 to 0.60, most preferably from 0.20 to 0.50.

In another embodiment, the ratio of the second amount of absorbent material within a second zone to the first amount of absorbent material within neighbouring one or more first zones in the absorbent core is greater than 1, preferably greater than 2, more preferably greater than 3, more preferably 4 to 20, even more preferably 5 to 19, most preferably 6 to 18.

When the absorbent article comprising the absorbent core is in use, the one or more zones having a lower amount of absorbent material than the one or more zones having a higher amount of absorbent material enable folding of the absorbent article comprising the absorbent core in a well-defined way in response to a lateral exerted compressive force and/or enable an improved fluid distribution in the absorbent core.

In an embodiment, the one or more second zones in the absorbent core comprising a second amount of absorbent material have a second density of absorbent material which is lower than a first density of absorbent material of the one or more first zones comprising a first amount of absorbent material. Preferably, the absorbent core preferably has an essentially constant thickness. Preferably, the ratio of the second density of absorbent material to the first density of absorbent material is 0.95 or lower, preferably 0.90 or lower, more preferably 0.80 or lower, even more preferably 0.70 or lower, most preferably 0.60 or lower.

In another embodiment, the one or more second zones in the absorbent core comprising a second amount of absorbent material have a second density of absorbent material which is higher than a first density of absorbent material of the one or more first zones comprising a first amount of absorbent material. Preferably, the absorbent core preferably has an essentially constant thickness. Preferably, the ratio of the first density of absorbent material to the second density of absorbent material is 0.95 or lower, preferably 0.90 or lower, more preferably 0.80 or lower, even more preferably 0.70 or lower, most preferably 0.60 or lower.

The one or more second zones may form channels, folding-lines, or combinations thereof. The one or more second zones comprising a second amount of absorbent material are preferably in the form of one or more continuous or discontinuous lines. The one or more first zones may form what we also call herein the bulk absorbent material.

In an embodiment, an absorbent core for an absorbent article is provided comprising an absorbent material, the absorbent core comprising bulk absorbent material having a bulk density and one or more zones or lines of absorbent material having a density which is lower than the bulk density of the bulk absorbent material.

When the absorbent article comprising the absorbent core is in use, the one or more zones or lines of absorbent material having a lower density than the one or more zones or lines of absorbent material having a higher density, for example the bulk density of the bulk absorbent material, enable folding of the absorbent article comprising the absorbent core in a well-defined way in response to a lateral exerted compressive force and/or enable an improved fluid distribution in the absorbent core.

Preferably, the absorbent core comprising the one or more first zones comprising a first amount of absorbent material and the one or more second zones comprising a second amount of absorbent material is a substantially monolithic structure.

The one or more zones or lines of absorbent material having a lower density than the bulk density of the bulk absorbent material enable increasing the speed of fluid distribution through the absorbent core.

When in use, lateral compressive forces are exerted by the thighs of an individual on an absorbent article positioned between the legs of the individual and the one or more zones or lines of absorbent material having a lower density will have a reduced stiffness and will fold easier than the bulk absorbent material having a higher bulk density. The one or more zones or lines of absorbent material having a lower density than the bulk density of the bulk absorbent material, for example comprised in the one or more first zones, will thus act as folding lines upon proper positioning of the lines in the absorbent core. The folding lines of absorbent material in the absorbent core having a lower density enable that an absorbent article comprising the absorbent core will fold in a well-defined way to ensure improved body fit resulting in improved efficiency of the absorbent article's ability to collect bodily fluids and to prevent leakage of the absorbent article.

The one or more zones or lines of absorbent material having a lower density than the bulk density of the bulk absorbent material enable to distribute fluid to be absorbed quickly through the absorbent core as the flow resistance for the liquid is lower in the lines of absorbent material having a lower density as compared to the flow resistance in the bulk absorbent material. The zones or lines of absorbent material having a lower density could be considered to constitute channels for fluid distribution in the absorbent core. Prior art folding lines in absorbent cores which are formed by compression of the absorbent material will have a higher density than the bulk density of the bulk absorbent material resulting in a higher flow resistance in the folding lines of absorbent material hampering the distribution of the liquid in the absorbent core.

Prior art folding lines in absorbent cores which are formed by removal of absorbent material from the bulk absorbent material have the same density as the bulk absorbent material and will therefore not improve the distribution of liquid in the absorbent core as the flow resistance will be the same in the folding lines and in the bulk absorbent material. Furthermore, the cross sectional area of the folding lines which is available for the liquid to flow through is actually reduced by removal of absorbent material from the bulk absorbent material thereby reducing the capacity of the folding lines of absorbent material for distributing liquid in the absorbent core hampering the distribution of the liquid in the absorbent core.

The term "absorbent article" refers to devices that absorb and contain liquid, and more specifically, refers to devices that are placed against or in proximity to the body of an individual to absorb and contain the various exudates discharged from the body of the individual. Absorbent articles include but are not limited to diapers, adult incontinence briefs, training pants, diaper holders and liners, sanitary napkins and the like, as well as surgical bandages and sponges. Absorbent articles preferably comprise a longitudinal axis and a transverse axis perpendicular to said longitudinal axis. The longitudinal axis is hereby conventionally chosen in the front-to-back direction of the absorbent article when referring to the absorbent article being worn, and the transverse axis is conventionally chosen in the left-to-right direction of the absorbent article when referring to the absorbent article being worn.

Disposable absorbent articles may include a liquid permeable top sheet, a back sheet joined to the top sheet, and an absorbent core positioned and held between the top sheet and the back sheet. The top sheet is operatively permeable to the liquids that are intended to be absorbed or contained (stored) by the absorbent article, and the back sheet may or may not be substantially impervious or otherwise operatively impermeable to the intended liquids. The absorbent article may also include other components, such as liquid wicking layers, liquid intake layers, liquid distribution layers, transfer layers, barrier layers, wrapping layers and the like, as well as combinations thereof. Disposable absorbent articles and the components thereof can operate to provide a body-facing surface and a garment-facing surface.

An absorbent article suitable for feminine external personal care is preferably designed to be secured to an inside surface of a person's undergarment by e.g. a garment adhesive and is designed to absorb fluids excreted from the body, e.g., blood, menses, and urine. The absorbent article is an elongated product having a central longitudinal axis x-x, a central transverse axis y-y, and a vertical axis z-z. The absorbent article, for example a feminine care pad or napkin, may include a liquid permeable top sheet or cover, a baffle or back sheet, which is preferably liquid-impermeable, and an absorbent core positioned and enclosed between the liquid permeable top sheet and the back sheet or baffle. Optionally, the absorbent article may comprise one or more separate layers which are in addition to the back sheet and are interposed between the back sheet and the absorbent core.

The "baffle" or "back sheet" are used herein as synonyms, and is preferably liquid-impermeable, and preferably designed to permit the passage of air or vapor out of the absorbent article while blocking the passage of body fluid. A liquid-impermeable baffle can be made from any material having these properties. The liquid-impermeable back sheet can also be constructed from a material that will block the passage of vapor as well as fluids, if desired. A suitable material from which the back sheet may be constructed is a micro-embossed, polymeric film, preferably a film comprising or consisting of a polyolefin, such as a polyethylene or a polypropylene. Bicomponent films may also be used as a back sheet.

Preferably, the back sheet is a film composed mainly of a polyethylene, i.e. composed for at least 50 wt. % of a polyethylene, preferably for at least 75 wt. %, more preferably for at least 90 wt. %, even more preferably for at least 95 wt. %.

The liquid permeable top sheet may be bonded or associated to the back sheet using any known method which does not leave any hard or uncomfortable residues that would annoy the individual using the absorbent article. Those skilled in the art are familiar with methods of bonding the various materials and for bonding other materials comprised in the absorbent article according to the present invention, including but not limited to the use of pressure-sensitive adhesives, hot-melt adhesives, two-sided adhesive sheets, ultrasonic welding and heat sealing. Adhesives such as hot-melt adhesives may be applied uniformly or in the form of a continuous or non-continuous layer. Preferably, the liquid permeable top sheet and the back sheet will each comprise a generally dog bone or hourglass configuration, the ends of the dog bone or hourglass shape being oriented in the direction of the central longitudinal axis. An absorbent article having a dog bone or hourglass shape is more comfortable to wear than a generally rectangular shaped product. The absorbent article may also be asymmetrical with respect to the central transverse axis.

The term "adhesive" as used herein is understood to include any suitable hot melt, water borne adhesive or solvent borne adhesive that can be applied to a surface of a film layer in a desired pattern or network of adhesive areas to form a film-nonwoven laminate. Accordingly, suitable adhesives include conventional hot melt adhesives, pressure-sensitive adhesives and reactive adhesives, such as for example a polyurethane adhesive.

As used herein, the term "adhesive bonding" means a bonding process which forms a bond by application of an adhesive. Such application of adhesive may be by various processes such as slot coating, spray coating and the like. Further, such adhesive may be applied within a product component and then exposed to pressure such that contact of a second product component with the adhesive containing product component forms an adhesive bond between the two components.

The "absorbent medium" or "absorbent core" or "absorbent body" in the absorbent article is preferably disposed between a liquid permeable top sheet and a back sheet in at least the crotch region of the absorbent article and is capable of absorbing and retaining liquid body exudates. The absorbent core may be manufactured in a wide variety of shapes (for example, rectangular, trapezoidal, T-shape, I-shape, hourglass shape, dog bone shape, etc.) and may comprise a wide variety of absorbent materials. Examples of absorbent materials include fluff pulp, preferably cellulosic fluff pulp, tissue layers, highly absorbent polymers (so called superabsorbent polymer particles or "SAP"), absorbent foam materials, absorbent nonwoven materials and the like, or any combination of two or more of these absorbent materials. For example, fluff pulp may be combined with superabsorbent polymers in an absorbent material. The absorbent core may comprise one or more layers of absorbent material stacked on top of each other.

It is also possible that the absorbent article comprises an acquisition and distribution layer. "Acquisition and distribution layer", "ADL" or "surge management portion" refers to a layer, which preferably is a nonwoven wicking layer, preferably located below the liquid permeable top sheet of an absorbent article, which further speeds up the transport and improves distribution of fluid throughout the absorbent core. The acquisition and distribution layer is typically less hydrophilic than the absorbent core, and has the ability to quickly collect and temporarily hold liquid surges, and to transport the liquid from its initial entrance point to other parts of the absorbent structure, particularly to other parts of the absorbent core. The acquisition and distribution layer may prevent or at least reduce the liquid from pooling and collecting on the portion of the absorbent article positioned against the individual's skin, thereby reducing the feeling of wetness by the individual. Preferably, the acquisition and distribution layer is positioned between the liquid permeable top sheet and the absorbent core.

The term "associated" is understood to encompass configurations in which the liquid permeable top sheet is directly joined to back sheet by affixing top sheet directly to back sheet, and configurations wherein the liquid permeable top sheet is joined to back sheet by affixing top sheet to intermediate members which in turn are affixed to back sheet. The liquid permeable top sheet and the back sheet may be affixed directly to each other by attachment means such as by an adhesive, by sonic bonds, by thermal bonds or by any other suitable attachment means known in the art. For example, a uniform continuous layer of adhesive, a patterned layer of adhesive, a sprayed pattern of adhesive or an array of separate lines, swirls or spots of construction adhesive may be used to affix top sheet to back sheet. It should be readily appreciated that the above-described attachment means may also be employed to interconnect and assemble together various other materials comprised in the absorbent article.

The absorbent core is preferably formed by depositing material constituting the absorbent core into a mould cavity or deposition cavity thereby forming a moulded absorbent material deposit structure. The material constituting the absorbent core may comprise any absorbent material or any combination of two or more absorbent materials. Suitable absorbent materials include fluff pulp, preferably cellulosic fluff pulp, tissue layers, highly absorbent polymers (so called superabsorbent polymer particles or "SAP"), absorbent foam materials, absorbent nonwoven materials and the like, or any combination of two or more of these absorbent materials.

The moulded absorbent material deposit structure preferably has a coherence which allows handling of the moulded absorbent material deposit structure, such as for example removal of the moulded absorbent material deposit structure from the deposition cavity without the moulded absorbent material deposit structure losing integrity causing the moulded absorbent material deposit structure to fall apart. Sufficient coherence for handling of the moulded absorbent material deposit structure may be obtained by any suitable means, for example by entanglement of fibers comprised in the moulded absorbent material deposit structure, by chemical bonds formed between constituents of the absorbent material(s), such as for example provided by VanderWaals forces or by hydrogen bonds, by thermal bonds between constituents of the absorbent material(s) which may for example be obtained by heating the absorbent material(s) inside the deposition cavity.

The mould cavity or deposition cavity preferably has an air permeable, porous or foraminous bottom surface which allows applying a vacuum to the absorbent materials inside the mould cavity, which enables that the moulded absorbent material deposit structure is maintained within the deposition cavity.

Depending on the strength of the vacuum applied through the porous bottom surface of the mould cavity an initial compaction of the moulded absorbent material deposit structure may be achieved and/or improved coherence in the moulded absorbent material deposit structure may be obtained improving handling of the moulded absorbent material deposit structure.

The mould cavity or deposition cavity may be located in any suitable surface, but is preferably located on the circumference of a drum, as is for example disclosed in U.S. Pat. No. 5,756,039 A. The shape of the exterior walls of the deposit cavity defines the outer shape of the resulting moulded absorbent material deposit structure and of the resulting absorbent core.

Preferably, the absorbent core has an essentially constant thickness. The term essentially constant thickness is understood to mean that the maximum thickness of the absorbent core is at most 1.5 times, preferably at most 1.25 times, more preferably at most 1.1 times, even more preferably at most 1.05 times the minimum thickness of the absorbent core as determined by the test method described herein.

The absorbent core according to the invention comprises one or more zones or lines of absorbent material having a density which is lower than the bulk density of the bulk absorbent material. Preferably, the ratio of the density of the lines of absorbent material over the bulk density of the bulk absorbent material in the absorbent core is lower than 1, preferably 0.05 to 0.80, more preferably 0.10 to 0.70, even more preferably 0.15 to 0.60, most preferably 0.20 to 0.50.

Preferably, the density of the lines of absorbent material having a density which is lower than the density of the one or more first zones or lines of absorbent material, e.g. the bulk density of the bulk absorbent material, is 300 kg/m$^3$ or lower, preferably 250 kg/m$^3$ or lower, more preferably 200 kg/m$^3$ or lower, most preferably 160 kg/m$^3$ or lower. Reducing the density of the lines improves the distribution speed of liquid through the absorbent core.

In an embodiment, the width of the one or more second zones or lines of absorbent material having a density which is lower than the density of the one or more first zones or lines of absorbent material is in the range of 1 to 6 mm, preferably in the range of 2 to 5 mm, more preferably in the range of 3 to 4 mm, to provide adequate fluid distribution in the absorbent core and/or to improve folding of the absorbent core in response to exerted lateral compressive forces.

The one or more zones or lines of absorbent material having a density which is lower than the density of the one or more first zones or lines of absorbent material may or may not extend through the entire thickness of the absorbent core. When the zones or lines of absorbent material having a lower density do not extend through the entire thickness of the absorbent core, the risk of leakage of fluid through the back sheet of an absorbent article is reduced. Zones or lines of absorbent material having a lower density which do not extend through the entire thickness of the absorbent core may be obtained by stacking layers of different absorbent material(s) in the deposit cavity.

When the zones or lines of absorbent material having a lower density do extend through the entire thickness of the absorbent core, maximum absorption of fluid in the absorbent core is promoted. Preferably, the one or more zones or lines of absorbent material having a density which is lower than the density of the one or more first zones or lines of absorbent material, e.g. the bulk density of the bulk absorbent material, extend to at least 10% of the thickness of the absorbent core, preferably to at least 15%, more preferably to at least 20%, more preferably to at least 25%, even more preferably from 30% to 80%, of the thickness of the absorbent core.

The absorbent core according to the invention preferably is a monolithic structure, i.e. a single element of material, which is not comprised of distinct segments which can be handled independently and which are to be combined into a composite absorbent core, as for example is disclosed by U.S. Pat. No. 5,756,039 A. The absorbent core according to the invention does not need to be built together from separate elements thus improving production efficiency and reducing costs.

The absorbent core according to the invention comprising one or more zones or lines of absorbent material having a density which is lower than the density of the one or more first zones or lines of absorbent material, e.g. the bulk density of the bulk absorbent material, enables folding of the absorbent core subjected to lateral compression forces and/or enables improved fluid distribution. Improvement of the fluid distribution in the absorbent core may be determined as a reduction in the Courtray acquisition time in according with the test method described herein. In an embodiment, the absorbent core has a Courtray acquisition time less than 850 seconds, preferably less than 750 seconds, more preferably less than 600 seconds, even more preferably less than 550 seconds.

Depositing absorbent material(s) in the mould cavity or deposition cavity may be performed using any suitable process. Preferably, depositing absorbent material(s) in the mould cavity is performed by an airlaying process, as is well known in the art as for example disclosed in U.S. Pat. No. 5,756,039 A.

The absorbent core according to the invention may comprise one or more suitable absorbent material(s), include for example fluff pulp, preferably cellulosic fluff pulp, tissue layers, highly absorbent polymers (so called superabsorbent polymer particles or "SAP"), absorbent foam materials, absorbent nonwoven materials and the like, or any combination of two or more of these absorbent materials.

In an embodiment, the absorbent core may be composed of a single absorbent material, preferably being selected from fluff pulp, preferably cellulosic fluff pulp, tissue layers, highly absorbent polymers (so called superabsorbent polymer particles or "SAP"), absorbent foam materials, absorbent nonwoven materials, for example to improve production efficiency.

In another embodiment, the absorbent core may comprise at least two different absorbent materials, each absorbent material individually preferably being selected from fluff pulp, preferably cellulosic fluff pulp, tissue layers, highly absorbent polymers (so called superabsorbent polymer particles or "SAP"), absorbent foam materials, absorbent nonwoven materials. The at least two different absorbent materials may be homogeneously mixed or may be applied in two or more separate layers.

In an embodiment, the bulk absorbent material in the absorbent core may comprise a first layer of absorbent material comprising fluff pulp, a second layer of absorbent material comprising super absorbing polymer or a homogeneous mixture of super absorbing polymer and fluff pulp, and a third layer of absorbent material comprising fluff pulp to provide better distribution of the liquids to the super absorbing polymer that then in turn absorbs and locks away the distributed liquid. Moreover, this arrangement ensures further protection of the backsheet and reduced risk of holes/puncturing cause by sharper edges of the SAP. Further advantages include better fluid spreading in the first fluff layer, load to core better spread and quicker intake time (acquisition time).

In a preferred embodiment the super absorbing polymer is comprised at a level of at least 5% wt, preferably at least 10%, more preferably more than 20%, by weight of the absorbent material. Preferably, the weight ratio (by weight of the absorbent material) of the super absorbing polymer and the fluff pulp is less than 20:80, preferably less than 15:85, more preferably from 1:99 to 14:86.

The absorbent core according to the invention comprises zones or lines of absorbent material having a density which is lower than the density of the one or more first zones or lines of absorbent material, e.g. the bulk density of the bulk absorbent material. The positioning of the zones or lines of absorbent material having a lower density in the absorbent core may be varied to provide channels for fluid distribution in the absorbent core.

The zones or lines of absorbent material having a lower density providing channels for fluid distribution in the absorbent core may be positioned in any direction in the absorbent core to optimize the fluid distribution through the absorbent core.

In an embodiment, the absorbent core comprises one or more second zones or lines of absorbent material having a density which is lower than the density of the one or more first zones or lines of absorbent material, e.g. the bulk density of the bulk absorbent material, which is/are extending essentially in parallel to the central longitudinal axis of the absorbent core to improve fluid distribution in a direction essentially parallel to the central longitudinal axis. The term extending essentially parallel to the central longitudinal axis is understood to mean that the zone or line of absorbent material having lower density and the central axis have an angle of intersection, which is an acute angle, preferably an acute angle of 30° or less, preferably 20° or less, more preferably 15° or less, even more preferably 10° or less. Two lines crossing each other will create four angles, generally two equally acute angles and two equally obtuse angles. The acute angle of intersection is determined at the crossing point of the line of absorbent material having lower density and the central longitudinal axis in case that there is indeed an actual intersection; in case the line of absorbent material having lower density and the central axis do not actually intersect in the absorbent core, either one or both of the line of absorbent material having lower density and the central longitudinal axis are extended imaginary until the lines would intersect. For the sake of clarity, it is stressed that the one or more second zones or lines of absorbent material having a density which is lower than the density of the one or more first zones or lines of absorbent material do not necessarily need to meet in a crossing point.

In an embodiment, the absorbent core comprises one or more zones or lines of absorbent material having a density which is lower than the density of the one or more first zones or lines of absorbent material, e.g. the bulk density of the bulk absorbent material, which is/are extending exactly parallel to the central longitudinal axis.

The one or more zones or lines of absorbent material having a density which is lower than the density of the one or more first zones or lines of absorbent material, e.g. the bulk density of the bulk absorbent material in the absorbent core, extending essentially or exactly in parallel to the central longitudinal axis may also act as folding lines when the absorbent core is subjected to lateral compression forces when in use to improve body fit.

In an embodiment, the absorbent core comprises one or more zones or lines of absorbent material having a density which is lower than the density of the one or more first zones or lines of absorbent material, e.g. the bulk density of the bulk absorbent material, which is/are extending essentially in parallel to the central transverse axis to improve fluid distribution in a direction essentially parallel to the central transverse axis. The term extending essentially parallel to the central transverse axis is understood to mean that the line of absorbent material having lower density and the central axis have an angle of intersection, which is an acute angle, preferably an acute angle of 30° or less, preferably 20° or less, more preferably 15° or less, even more preferably 10° or less.

In an embodiment, the absorbent core comprises one or more zones or lines of absorbent material having a density which is lower than the density of the one or more first zones or lines of absorbent material, e.g. the bulk density of the bulk absorbent material, which are extending exactly parallel to the central transverse axis.

The one or more zones or lines of absorbent material having a density which is lower than the density of the one or more first zones or lines of absorbent material, e.g. the bulk density of the bulk absorbent material in the absorbent core, extending essentially or exactly in parallel to the central transverse axis may also act as folding lines to fold the absorbent article comprising the absorbent core together into a smaller form so that the absorbent article may for example fit easier into a purse.

The one or more second zones or lines of absorbent material having a density which is lower than the density of the one or more first zones or lines of absorbent material form a pattern which is symmetrical with respect to a central longitudinal axis of the absorbent core- and wherein preferably at least two second zones extend along and substantially parallel to said central longitudinal axis at opposing and distal sides thereof.

The absorbent core comprising one or more zones or lines of absorbent material having a density which is lower than the density of the one or more first zones or lines of absorbent material, e.g. the bulk density of the bulk absorbent material, extending essentially or exactly in parallel to the central longitudinal axis and/or one or more lines of absorbent material having a density which is lower than the bulk density of the bulk absorbent material extending essentially or exactly in parallel to the central transverse axis may comprise additional zones or lines of absorbent material having a density which is lower than the bulk density of the bulk absorbent material to connect the one or more zones or lines of absorbent material extending essentially or exactly in parallel to the central longitudinal axis and/or the one or more zones or lines of absorbent material extending essentially or exactly in parallel to the central transverse axis into a network of connected lines of absorbent material having lower density for optimizing the fluid distribution in the absorbent core and/or to create folding lines in the absorbent core for improved body fit.

In an embodiment, the absorbent core may comprise one or more second zones or lines of absorbent material having a second density which is lower than the first density of the one or more first zones or lines of absorbent material, e.g. the bulk density of the bulk absorbent material, and one or more third zones or lines of absorbent material having a third density which is lower than the first density of the one or more first zones or lines of absorbent material, e.g. the bulk density of the bulk absorbent material, wherein the one or more second zones or lines of absorbent material have a second density which is lower than the density of the one or more third zones or lines of absorbent material having a third density. The one or more zones or lines of absorbent material having a second density which is lower than the third density and which is lower than the first density of the first zones or lines, e.g. the bulk density of the bulk absorbent material, will fold the easiest when lateral forces are exerted, e.g. by the thighs of an individual on an absorbent article positioned between the legs of the individual, thereby ensuring body fit of the absorbent article comprising the absorbent core. The one or more lines of absorbent material having a third density which is higher than the second density and which is lower than the first density, e.g. the bulk density of the bulk absorbent material, will provide channel(s) for fluid distribution, but will not (yet) fold. However, upon reaching a certain threshold level of the exerted lateral compressive forces, the one or more zones or lines of absorbent material having the third density may act as additional folding lines to ensure improved body at increasing compressive forces.

Preferably, the absorbent core comprises two end portions and a central portion therebetween extending parallel to the central longitudinal axis of the absorbent core, and at least two second zones or lines converge to one point proximal to at least one, preferably both, said end portions such to form one or two v-shaped ends in particular for improved body fit. Alternatively, at least two second zones or lines run parallel along said central portion and further converge to one point proximal to at least one, preferably both, of the end portions such to form one or two v-shaped ends for improved body fit, preferably the at least two second zones or lines being interconnected by one or more further second zones or lines, and/or one or more third zones or lines comprising a third amount of absorbent material, the third amount of absorbent material being different from the first amount of absorbent material and second amount of absorbent material, the one or more further second zones or lines and/or one or more third zones or lines extending along the central transverse axis, more preferably wherein the one or more further second zones or lines and/or one or more third zones or lines are arranged to form a cross-shaped connection on the central portion of the absorbent core.

It is understood that the absorbent core may likewise comprise fourth zones, fifth zones, sixth zones or even more zones or lines of absorbent material, each having different amounts of absorbent material, preferably each having different densities, to optimize the body fit of and/or the fluid distribution in the absorbent article comprising the absorbent core.

Preferably, the ratio of the second density of the one or more zones or lines of absorbent material having a second density to the first density of the one or more zones or lines of absorbent material having a first density is 0.95 or lower, preferably 0.90 or lower, more preferably 0.80 or lower, even more preferably 0.70 or lower, most preferably 0.60 or lower.

In an embodiment, at least one zone or line of absorbent material having a density which is lower than the density of the one or more first zones or lines of absorbent material, e.g. the bulk density of the bulk absorbent material, in the absorbent core is positioned such that, when in use, the line of absorbent material having lower density is located at the point where the body of the individual exudates a fluid to be absorbed, such that the fluid can be distributed quickly through the absorbent core. Preferably, at least one of the zones or lines of absorbent material having a density which is lower than the density of the one or more first zones or lines of absorbent material, e.g. the bulk density of the bulk absorbent material, in the absorbent core is positioned at the crossing point of the central longitudinal axis and the central transverse axis of the absorbent article, as the absorbent core is preferably designed such that the point where the body of the individual exudates a fluid to be absorbed coincides with the crossing point of the central longitudinal axis and the central transverse axis of the absorbent article for optimum distribution and absorption of the fluid.

In an embodiment, at least two second zones or lines of absorbent material having a density which is lower than the first density of the one or more first zones or lines of absorbent material, e.g. the bulk density of the bulk absorbent material in the absorbent core, are positioned such that, when in use, the second zones or lines of absorbent material meet each other, preferably cross each other, near, preferably at, a point of the central portion of the absorbent core, preferably the point where the body of the individual exudates a fluid to be absorbed, such that the fluid can be distributed quickly through the absorbent core in a symmetrical pattern. For the sake of clarity, the crossing angle between these at least two second zones or lines of absorbent material may be 90° or different. Preferably, at least two second zones or lines of absorbent material having a density which is lower than the first density of the one or more first zones or lines of absorbent material, e.g. the bulk density of the bulk absorbent material in the absorbent core, are positioned such that, when in use, the second zones or lines of absorbent material meet each other, preferably cross each other, near, preferably at, the crossing point of the central longitudinal axis and the central transverse axis of the absorbent article, as the absorbent core is preferably designed such that the point where the body of the individual exudates a fluid to be absorbed coincides with the crossing point of the central longitudinal axis and the central transverse axis of the absorbent article for optimum distribution and absorption of the fluid. For the sake of clarity, it is stressed that the one or more second zones or lines of absorbent material having a density which is lower than the density of the one or more first zones or lines of absorbent material do not necessarily need to meet in a crossing point.

Preferably, the second zones or lines of absorbent material having a density which is lower than the density of the one or more first zones or lines of absorbent material, e.g. the bulk density of the bulk absorbent material, in the absorbent core form a pattern which is symmetrical with respect to central longitudinal axis of the absorbent core and/or symmetrical with respect to central transverse axis of the absorbent core for optimum distribution and absorption of the fluid in the absorbent core.

Another object of the invention is to provide a process for providing an absorbent core for an absorbent article in accordance with any of the embodiments above having improved body fit and/or improved fluid distribution.

The object is obtained with the process for providing an absorbent core for an absorbent article according to claim 13.

In an embodiment, a process is provided for providing an absorbent core for an absorbent article, the process comprising the steps of:
 i. providing a mould cavity comprising a shaping profile member, the mould cavity preferably having an air permeable base surface,
 ii. inserting one or more absorbent materials into the mould cavity comprising the shaping profile member to form a moulded absorbent material deposit structure,
 iii. removing the moulded absorbent material deposit structure from the mould cavity to form an absorbent core comprising one or more first zones comprising a first amount of absorbent material and one or more second zones comprising a second amount of absorbent material, wherein each second zone is at least partly delimited by said one or more first zones, said second zones having the inverse shape of the shaping profile member and wherein said first and second amounts of absorbent material, each measured as a weight per unit area, are different.

In an embodiment, step i. of the process comprises the step of inserting the shaping profile member into the mould cavity.

In an embodiment, the air permeable base surface is in fluid communication (preferably air communication) with an under pressure source arranged to provide a vacuum force.

The process preferably comprises the step of applying a first air permeable material layer, preferably a nonwoven web, into the mould cavity comprising the shaping profile member prior to the process step of inserting the one or more absorbent materials into the mould cavity.

Preferably, the process comprises the step of applying a second material layer, preferably a nonwoven web, directly or indirectly over the one or more absorbent materials after the process step of inserting one or more absorbent materials into the mould cavity.

The absorbent material inserted into the mould cavity may be bonded to the first air permeable material layer and/or the second material layer, for example by lamination or any other suitable bonding technique discussed above.

Preferably, the process comprises the step of applying a bonding step to form a laminate comprising the first air permeable material layer, the second material layer and the one or more absorbent materials therebetween.

Preferably, in the process step ii. a pressure difference, preferably a vacuum force, is arranged over the air permeable base surface of the mould cavity to cause the one or more absorbent materials to displace relative to the shaping profile member and to form one or more first zones comprising a first amount of absorbent material and one or more second zones comprising a second amount of absorbent material.

In an embodiment, the shaping profile member of the process is a three-dimensional structure, preferably formed by a 3D printing process, and preferably the shaping profile member is not in fluid communication with the pressure difference, preferably a vacuum force, arranged over the air permeable base surface of the mould cavity.

In another embodiment, the shaping profile member is in the form of one or more recesses carved within the base surface of the mould cavity, and preferably the shaping profile member is in fluid communication with the pressure difference, preferably a vacuum force, arranged over the air permeable base surface of the mould cavity.

In the process the shaping profile member is preferably arranged in the mould cavity such that a second pressure difference, preferably a second vacuum force, is provided that is less than, equal to or greater than the pressure difference provided at sections of the base surface distal from said shaping profile member, or wherein the one or more recesses comprise a depth extending perpendicular to the plane formed by the ends and sides of the base and said depth being sized such that absorbent material is displaced into said one or more recesses wherein said second vacuum force is equal to the vacuum force provided at sections of the base distal from said shaping profile member.

Preferably, in the process the one or more first zones and/or the one or more second zones comprising a second amount of absorbent material in the absorbent core are formed in absence of a direct mechanical action, such as compression of the second amount of absorbent material by embossing.

In an embodiment, a process is provided for providing an absorbent core for an absorbent article, the absorbent core comprising bulk absorbent material and one or more zones or lines of absorbent material having a density which is lower than the density of the one or more first zones or lines of absorbent material, e.g. the bulk density of the bulk absorbent material, in the absorbent core for improved body fit and/or for improved fluid distribution, comprising the steps of inserting a shaping profile member, preferably a three-dimensional structure, into a mould cavity, inserting one or more absorbent materials into the mould cavity comprising the shaping profile member, preferably a three-dimensional structure, to form a moulded absorbent material deposit structure, removing the moulded absorbent material deposit structure from the mould cavity and compressing the moulded absorbent material deposit structure to reduce the thickness and to consolidate the moulded absorbent material deposit structure into an absorbent core comprising zones or lines of absorbent material having a density which is lower than the density of the one or more first zones or lines of absorbent material, e.g. the bulk density of the bulk absorbent material.

The process for providing an absorbent core comprises the step of depositing one or more absorbent materials in a mould cavity or deposit cavity to form a moulded absorbent material deposit structure, wherein a shaping profile member, preferably a three-dimensional structure, has been inserted in the mould prior to depositing the one or more absorbent materials in the mould cavity. Due to the presence of the shaping profile member, preferably a three-dimensional structure, in the deposit cavity, the deposition of the one or more absorbent materials is restricted to the volume of the mould which is not occupied by the shaping profile member, preferably a three-dimensional structure, thereby reducing the total amount or weight of absorbent material over the thickness of the moulded absorbent material deposit structure at locations where the three-dimensional structure occupies part of the volume of the deposit cavity.

When in use, lateral compressive forces are exerted by the thighs of an individual on the absorbent article positioned between the legs of the individual, the zones or lines of absorbent material having a lower density will have a reduced stiffness and will fold easier than the bulk of absorbent material having a higher bulk density. Proper positioning of the zones or lines having a lower density in the absorbent core enables that an absorbent article comprising the absorbent core will fold in a well-defined way to ensure improved body fit resulting in improved efficiency of the absorbent article's ability to collect bodily fluids and to prevent leakage.

The zones or lines of absorbent material having a lower density than the first density of the one or more first zones or lines of absorbent material, e.g. the bulk density of the bulk absorbent material, enable to distribute the fluid to be absorbed quickly as the flow resistance for the liquid is lower in the zones or lines having a lower density than the flow resistance in the bulk absorbent material having a higher bulk density. The zones or lines of absorbent material having a lower density could thus be considered to constitute channels for fluid distribution in the absorbent core.

Folding lines in absorbent cores which are formed by compression of the absorbent material have a higher density than the bulk absorbent material resulting in a higher flow resistance in the folding lines hampering the distribution of liquid in the absorbent core.

The mould cavity or deposition cavity preferably has an air permeable, porous or foraminous bottom surface which allows applying a pressure difference, preferably a vacuum, to the absorbent material(s) inside the mould, which enables that the moulded absorbent material deposit structure is maintained within the deposition cavity.

Depending on the strength of the pressure difference, preferably a vacuum, being applied through the porous bottom or base surface of the mould cavity an initial compaction of the moulded absorbent material deposit structure may be achieved and/or improved coherence in the moulded absorbent material deposit structure may be obtained improving handling of the moulded absorbent material deposit structure.

The mould cavity or deposition cavity may be located in any suitable surface, but is preferably located on the circumference of a drum, as is for example disclosed in U.S. Pat. No. 5,756,039 A. The shape of the exterior walls of the deposit cavity defines the outer shape of the resulting moulded absorbent material deposit structure and the resulting absorbent core.

Depositing one or more absorbent material(s) in the mould cavity or deposition cavity in the process for providing an absorbent core having improved body fit and/or improved fluid distribution may be performed using any suitable method.

Preferably, depositing one or more absorbent material(s) in the deposition cavity is performed by an airlaying process, as is well known in the art as for example disclosed in U.S. Pat. No. 5,756,039 A.

The process step of depositing one or more absorbent materials in the mould cavity or deposition cavity may comprise a series of depositing process steps consecutively depositing multiple layers of absorbent material, each layer comprising one or more absorbent materials to obtain an absorbent core comprising multiple stacked layers of different absorbent material(s). Preferably, the one or more absorbent materials in each layer is being selected from fluff pulp, preferably cellulosic fluff pulp, tissue layers, highly absorbent polymers (so called superabsorbent polymer particles or "SAP"), absorbent foam materials, absorbent nonwoven materials and the like, or any combination of two or more of these absorbent materials.

In an embodiment, the process comprises only a single depositing step to obtain an absorbent core composed of a single layer of absorbent material(s), which may be composed of a single absorbent material, preferably being selected from fluff pulp, preferably cellulosic fluff pulp, tissue layers, highly absorbent polymers (so called superabsorbent polymer particles or "SAP"), absorbent foam materials, absorbent nonwoven materials and the like, or any mixture of two or more of these absorbent materials.

In another embodiment, the process comprises two or more consecutive depositing steps to obtain an absorbent core composed of two or more stacked layers of absorbent materials, wherein each layer may be composed of a single absorbent material, preferably being selected from fluff pulp, preferably cellulosic fluff pulp, tissue layers, highly absorbent polymers (so called superabsorbent polymer particles or "SAP"), absorbent foam materials, absorbent nonwoven materials and the like, or any mixture of two or more of these absorbent materials.

In an embodiment, the process comprises three consecutive depositing steps to obtain an absorbent core composed of three stacked layers of absorbent materials, wherein the first layer of absorbent material comprises fluff pulp, the second layer of absorbent material comprises super absorbing polymer or a homogeneous mixture of super absorbing polymer and fluff pulp, and the third layer of absorbent material comprises fluff pulp.

The process comprises the step of removing the moulded absorbent material deposit structure from the mould cavity. Preferably, the moulded absorbent material deposit structure has a coherence which allows handling of the moulded absorbent material deposit structure, such as for example removal of the moulded absorbent material deposit structure from the deposition cavity without the moulded absorbent material deposit structure losing integrity causing the the moulded absorbent material deposit structure to fall apart. Sufficient coherence for handling of the moulded absorbent material deposit structure may be obtained by any suitable means, for example by entangling fibers comprised in the moulded absorbent material deposit structure, by creating chemical bonds between constituents of the absorbent materials, such as for example by VanderWaals forces or by hydrogen bonds between constituents of the absorbent materials, by creating thermal bonds between constituents of the absorbent materials which may for example be obtained by heating the absorbent materials inside the deposition cavity.

After removing the moulded absorbent material deposit structure from the mould, the moulded absorbent material deposit structure exhibits a profiled surface. The presence of the three-dimensional structure in the mould results in lines of indentations in the moulded absorbent material deposit structure. These lines of indentations may in itself act as folding lines in the moulded absorbent material deposit structure. When the moulded absorbent material deposit structure has sufficient coherence the moulded absorbent material deposit structure may be used as an absorbent core without further consolidation.

Preferably, the process further comprises the step of compressing the moulded absorbent material deposit structure removed from the mould to reduce the thickness and to consolidate the moulded absorbent material deposit structure into an absorbent core comprising lines of absorbent material having a density which is lower than the density of the one or more first zones or lines of absorbent material, e.g. the bulk density of the bulk absorbent material. Preferably, the absorbent core has an essentially constant thickness after compressing the moulded absorbent material deposit structure into an absorbent core. The term essentially constant thickness is understood to mean that the maximum thickness of the absorbent core is at most 1.5 times, preferably at most 1.25 times, more preferably at most 1.10 times, even more preferably at most 1.05 times the minimum thickness of the absorbent core. Thickness is measured according to the test method described herein.

Compressing the moulded absorbent material deposit structure removed from the mould may be performed by any suitable process which applies a compressive force on the whole surface of the moulded absorbent material deposit structure or only on specific locations of the surface of the moulded absorbent material deposit structure, thereby reducing the thickness of (specific locations of) the moulded absorbent material deposit structure and consolidating the moulded absorbent material deposit structure into an absorbent core comprising zones or lines of absorbent material having a density which is lower than the density of the one or more first zones or lines of absorbent material, e.g. the bulk density of the bulk absorbent material. The process step of compressing the moulded absorbent material deposit structure may include heating of the moulded absorbent material deposit structure to improve compression of the moulded absorbent material deposit structure. Heating of the moulded absorbent material deposit structure is particularly useful when heat-fusible thermoplastic fibres are included in the moulded absorbent material deposit structure.

The most commonly used method for compressing an absorbent core is embossing or stamping. Embossing is usually achieved by a combination of die and anvil rolls. The surface of the anvil roll may be hardened or may be made from a flexible material such as a rubber. The absorbent core is urged between a die roll and an anvil roll to compress the moulded absorbent material deposit structure. Depending on the surface structure of the die roll and/or the anvil roll the surface of the absorbent core may comprise a texture.

Compressing the moulded absorbent material deposit structure removed from the mould is preferably performed until the one or more zones or lines of absorbent material having a density which is lower than the density of the one or more first zones or lines of absorbent material, e.g. the bulk density of the bulk absorbent material has a density such that the ratio of the density of the lines of absorbent material over the bulk density of the bulk absorbent material in the absorbent core is 0.95 or lower, preferably 0.90 or lower, more preferably 0.80 or lower, even more preferably 0.70 or lower, most preferably 0.60 or lower.

Preferably, compressing the moulded absorbent material deposit structure is performed until the density of the one or more zones or lines of absorbent material having a density which is lower than the density of the one or more first zones or lines of absorbent material, e.g. the bulk density of the bulk absorbent material, is 300 kg/m$^3$ or lower, preferably 250 kg/m$^3$ or lower, more preferably 200 kg/m$^3$ or lower, most preferably 160 kg/m$^3$ or lower.

The shaping profile member, preferably a three-dimensional structure, inserted into the mould cavity prior to depositing one or more absorbent materials into mould may be physically connected to one or more exterior surfaces of the mould cavity defining the shape or contour of the absorbent core to ensure correct positioning of the three-dimensional structure and consequently correct positioning of the lines of absorbent material having a density which is lower than the density of the one or more first zones or lines of absorbent material, e.g. the bulk density of the bulk absorbent material, in the absorbent core.

However, the shaping profile member, preferably a three-dimensional structure, may also be placed into the mould without physically connecting the shaping profile member, preferably a three-dimensional structure, to one or more exterior surfaces of the mould. For example, the three-dimensional structure may be shaped such that the three-dimensional structure fits exactly within the deposit cavity, preferably being in direct contact with one or more exterior surfaces of the mould cavity to ensure proper positioning of the three-dimensional structure in the deposit cavity and consequently correct positioning of the zones or lines of absorbent material having a density which is lower than the density of the one or more first zones or lines of absorbent material, e.g. the bulk density of the bulk absorbent material, in the absorbent core. As there is no physical connection between the shaping profile member, preferably a three-dimensional structure, and the exterior surfaces of the mould, the shaping profile member may be simply removed from the mould cavity and replaced by another shaping profile member or three-dimensional structure, e.g. for providing an absorbent core with different specifications.

In another embodiment, the shaping profile member or three-dimensional structure is shaped such that the three-dimensional structure fits loosely within the deposit cavity without physically connecting the three-dimensional structure to one or more exterior surfaces of the mould cavity and without contacting the exterior surfaces of the mould to provide lines of absorbent material having a density which is lower than the density of the one or more first zones or lines of absorbent material, e.g. the bulk density of the bulk absorbent material, in the absorbent core which do not extend to the outer contour of the absorbent core, which reduces the risk of leakage of fluid at the outer contour of the absorbent core. Proper positioning of the three-dimensional structure in the mould may for example be ensured by a sufficiently strong vacuum applied through a porous bottom surface of the deposit cavity or by an adhesive material.

The shaping profile member or three-dimensional structure may be configured in any desired shape to provide zones or lines of absorbent material having a density which is lower than the density of the one or more first zones or lines of absorbent material, e.g. the bulk density of the bulk absorbent material.

The shaping profile member or three-dimensional structure may be formed by any suitable process. The three-dimensional structure may for example be a formed netting. Preferably, the three-dimensional structure is formed by a 3D printing process, which is a versatile process to provide any desired shape of three-dimensional structure.

The 3D printing process may even be used to 3D print the mould cavity comprising said shaping profile member as one single part.

The three-dimensional structure may be formed from any suitable material, including metals like steel, stainless steel, aluminum alloy, titanium alloy, stainless steel, nickel alloy, brass, bronze, copper, cobalt chromium, chromium carbide-nickel, aluminide blend, silver, gold, platinum, and mixtures thereof; plastics like polyamide (PA), aluminum-filled polyamide (Alumide=PA12-MD(AI)), glass-filled polyamide (PA-GF), polycarbonate, thermoplastic polyurethane, acrylonitrile butadiene styrene (ABS) or polybutylene terephthalate (PBT) or polyamide, polypropylene (PP), acrylic plastics (such as poly(methyl methacrylate)), polylactic acid (PLA), polyethylene terephthalate (PET), polyphenylsulfone (PPSF)/polyphenylsulfone (PPSU), polyvinyl acetate (PVA), high impact polystyrene (HIPS), polyoxymethylene (POM) (or acetal), polyether ether ketone (PEEK), polyether amide (PEBA), carbon fiber filled plastics, resins (such as NeXt, Xtreme, Ultem, Mammoth), and mixtures thereof; ceramics, porcelain, terracotta, gypsum (sandstone), stone, and mixtures thereof; organic materials like wood, paper and mixtures thereof; and mixtures thereof. Most preferred are steel, stainless steel, aluminum alloy, titanium alloy or Alumide.

Preferably, the three-dimensional structure comprises or consists of a material which is capable of dissipating electric charge, such as for example alumide, i.e. a mixture of a polyamide and aluminum powder, to avoid negative effects of static charge build up inside the deposit cavity. Alumide can advantageously be processed in 3D printing processes. The alumide typically contains polyamide comprising aluminum particles preferably have an average grain size of from 40 to 80 μm, preferably from 50 to 70 μm (according to ISO 13320-1) and typically a laser diffraction of from 2 to 3 mil. Said particles may further exhibit a shore D hardness of from 60 to 90, preferably from 70 to 80 (according to ISO 868).

Alternatively, the three-dimensional structure comprises or consists of titanium alloy, e.g. Titanium Grade 5. Titanium Grade 5 can advantageously be processed in 3D printing processes In an embodiment, the three-dimensional structure inserted into the deposit cavity comprises one or more strands or ribs which is/are extending essentially in parallel to the central longitudinal axis of the deposit cavity to provide lines of lower density in the absorbent core extending essentially in parallel to the central longitudinal axis of the absorbent core to improve fluid distribution in a direction essentially parallel to the central longitudinal axis. The term extending essentially parallel to the central longitudinal axis is understood to mean that the strand of the three-dimensional structure and the central axis have an angle of intersection, which is an acute angle, preferably an acute angle of 30° or less, preferably 20° or less, more preferably 15° or less, even more preferably 10° or less.

In an embodiment, the three-dimensional structure inserted into the deposit cavity comprises one or more strands or ribs which is/are extending exactly parallel to the central longitudinal axis of the deposit cavity.

In an embodiment, the three-dimensional structure inserted into the deposit cavity comprises one or more strands or ribs which is/are extending essentially in parallel to the central transverse axis of the deposit cavity to provide lines of lower density in the absorbent core extending essentially in parallel to the central transverse axis of the absorbent core to improve fluid distribution in a direction essentially parallel to the central transverse axis. The term extending essentially parallel to the central transverse axis is understood to mean that the line of absorbent material having lower density and the central axis have an angle of intersection, which is an acute angle, preferably an acute angle of 30° or less, preferably 20° or less, more preferably 15° or less, even more preferably 10° or less.

In an embodiment, the three-dimensional structure inserted into the deposit cavity comprises one or more strands or ribs which is/are extending exactly parallel to the central transverse axis of the deposit cavity.

The three-dimensional structure inserted into the deposit cavity comprising one or more strands or ribs extending essentially or exactly in parallel to the central longitudinal axis of the deposit cavity and/or one or more strands or ribs extending essentially or exactly in parallel to the central transverse axis of the deposit cavity may comprise additional strands or ribs connecting the one or more strands or ribs extending essentially or exactly in parallel to the central longitudinal axis of the deposit cavity and the one or more strands or ribs extending essentially or exactly in parallel to the central transverse axis of the deposit cavity to provide a network of lines of absorbent material having lower density for optimizing the fluid distribution in the absorbent core and/or to create folding lines in the absorbent core for improved body fit.

In an embodiment, the three-dimensional structure inserted into the mould may comprise one or more first strand(s) or ribs for forming one or more lines of absorbent material having a first density which is lower than the density of the one or more first zones or lines of absorbent material, e.g. the bulk density of the bulk absorbent material, and one or more second strand(s) or ribs for forming one or more lines of absorbent material having a second density which is lower than the bulk density of the bulk absorbent material wherein the one or more line(s) of absorbent material have a first density which is lower than the density of the one or more zones or lines of absorbent material having a second density, wherein the one or more first strand(s) have a greater height than the height of the one or more second strand(s) to provide one or more lines of absorbent material having a first density which is lower than the density of one more zones or lines of absorbent material having a second density after compressing the moulded absorbent material deposit structure. As the first strands have a larger height than the second strands, the volume of the mould which is not occupied by the first strand(s) is less at the location where the first strands are positioned than at the locations where the second strand(s) are located thereby reducing the total amount or weight of absorbent material across the thickness of the moulded absorbent material deposit structure at locations where the first strands are located as compared to the locations where the second strands are located.

The three-dimensional structure inserted into the mould preferably comprises strands having a width in the range of 0.1 to 5 mm, preferably in the range of 0.5 to 3 mm, more preferably in the range of 0.8 to 2 mm, to provide zones or lines of absorbent material having a density which is lower than the density of the one or more first zones or lines of absorbent material, e.g. the bulk density of the bulk absorbent material, having an adequate width for sufficient fluid distribution in the absorbent core and/or to improve folding of the absorbent core.

FIG. 1 schematically depicts an exemplary mould cavity (10) comprising a shaping profile member (11, 12, 13), also sometimes called herein "insert". The shaping profile member comprises strands (11) extending essentially in the longitudinal direction of the absorbent core and strands (12) extending along in transversal direction. The strands (12) extending along in transversal direction cross each other, preferably at the point where the body of an individual exudates a fluid to be absorbed.

The shaping profile member comprises strands (13) such that shaping profile member fits exactly in the mould cavity (10) and a correct placement of the shaping profile member in the mould cavity (10) is ensured.

At the location of the strands (11, 12, 13) of the shaping profile member less absorbent material can be deposited in the mould cavity, such that second zones of absorbent material are formed comprising a lower amount of absorbent material than the first zones of absorbent material formed at the locations in the mould cavity where no strands are positioned. The dotted arrows indicate the distribution of fluid in the absorbent core through the second zones comprising a lower amount of absorbent material.

FIG. 2 schematically depicts another exemplary mould cavity (20) comprising a shaping profile member (11, 12, 13). The difference with FIG. 1 is that the strands (22) extending along in transversal direction do not cross each other, but meet each other near the point where the body of an individual exudates a fluid to be absorbed.

FIGS. 5a to 5e schematically show other exemplary mould cavities comprising various shaping profile members such that second zones of absorbent material are formed comprising a lower amount of absorbent material than the first zones of absorbent material formed at the locations in the mould cavity where no strands are positioned.

In FIG. 5a, the shaping profile member comprise two strands crossing each other, so that a resulting absorbent core may be manufactured having two second zones crossing each other, preferably at the point where the body of an individual exudates a fluid to be absorbed. Such cross design may be advantageous to decrease the Courtray acquisition time as defined herein, by improving the distribution of fluid in the absorbent core.

In FIG. 5b, the shaping profile member comprises strands forming two v-shaped ends, so that a resulting absorbent core may be manufactured having two second zones converging to one point proximal to both end portions such to form one or two v-shaped ends. Such design may be advantageous for improving body fit.

FIG. 5c combines both the strands of FIGS. 5a and 5b.

In FIG. 5d, the shaping profile member comprises strands forming two v-shaped ends and additionally comprises a strand extending essentially in the longitudinal direction of the mould cavity, from each v-shaped end towards the end portions of the mould cavity. Such design may be advantageous for further improving body fit.

FIG. 5e combines both the strands of FIGS. 5a and 5d.

Figures 6A, 6B:
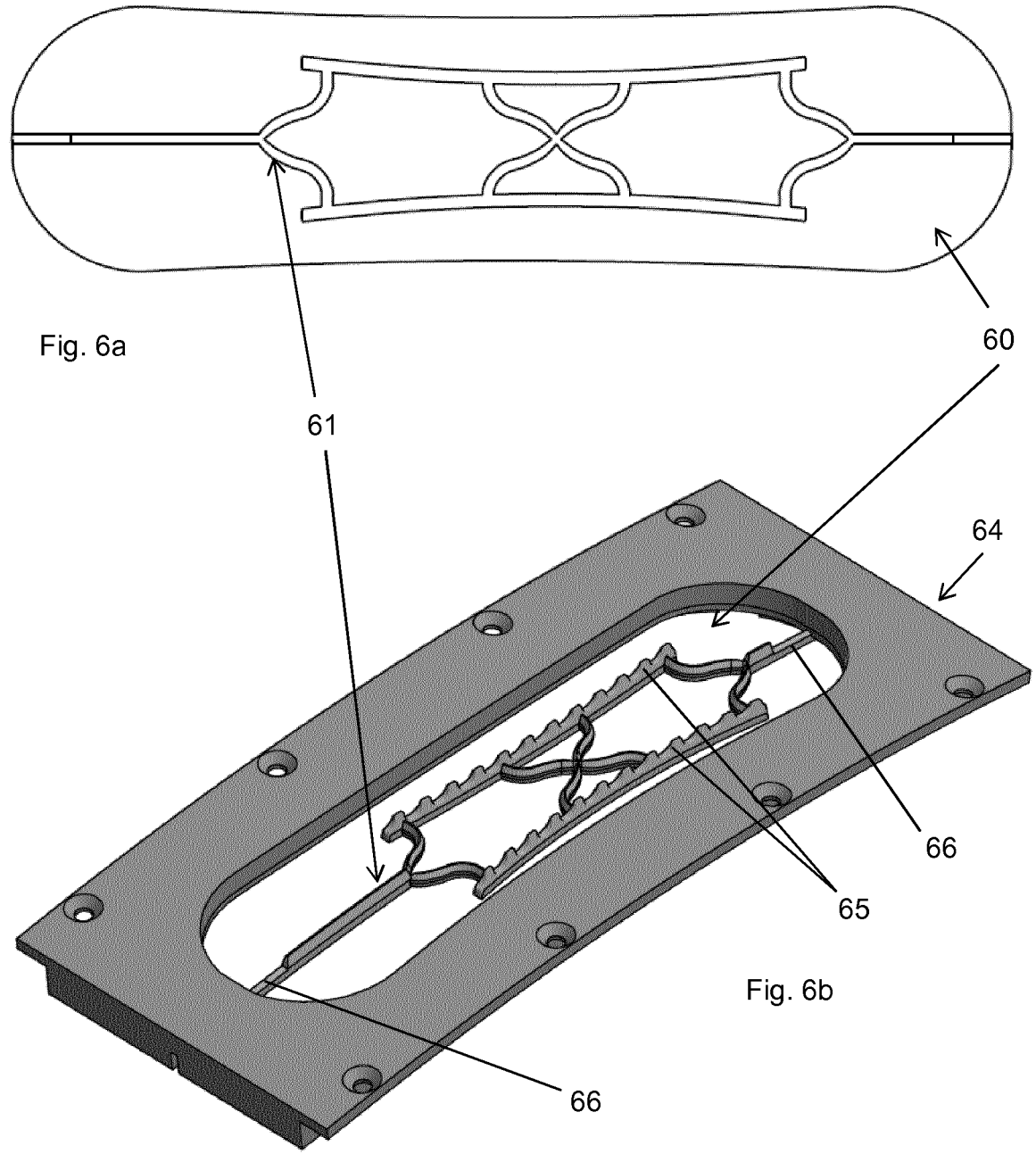
FIG. 6a schematically depicts another exemplary mould cavity comprising a shaping profile member.
FIG. 6b shows a 3D image of an upper part of a mould.

FIG. 6a schematically depicts another exemplary mould cavity (60) comprising a shaping profile member (61), and FIG. 6b shows a 3D image of an upper part of a mould (64), with the same mould cavity (60) and shaping profile member (61) as in FIG. 6a. In this exemplary embodiment, the cross and the v-shaped ends, together with a portion of the strands extending essentially in the longitudinal direction of the mould cavity, from each v-shaped end towards the end portions of the mould cavity, have a certain height (h2) such that second zones of absorbent material are formed comprising a lower amount of absorbent material than the first zones of absorbent material formed at the locations in the mould cavity where no strands are positioned. The two other strands (65) extending essentially in the longitudinal direction of the mould cavity are corrugated, with varying heights between h2 and h3 (with h3 being less than h2), such that respective second and third zones of absorbent material are formed comprising a lower amount of absorbent material than the first zones of absorbent material, with third zones comprising a higher amount of absorbent material than the second zones of absorbent material. The most distal portions (66) of the strands extending essentially in the longitudinal direction of the mould cavity, from each v-shaped end towards the end portions of the mould cavity, are mainly there to ensure that shaping profile member fits exactly in the mould cavity and to ensure a correct placement of the shaping profile member in the mould cavity. Their height is less than h2, and preferably less or equal to h3.

Thickness Measurement Method

Thickness measurements are carried out with a thickness gauge, with accuracy of 0.1 mm. Diameter of the pressure foot is 30 mm and the pressure is 20 g/cm$^2$.

Thickness measurements are taken directly after taking products out of a complete package or a complete row of products. The measurement is done in the central part of the product, out of the folding lines. The product is placed with the release paper or pouch, towards the table. The pressure foot needs to be lowered gently towards the product. The reading is done when the needle is stable. Thickness is measured on minimum 3 pieces.

Courtray Aquisition Time Method

The "acquisition time method" as defined by SGS Courtray Laboratories (Oignies, France) (POA/DF4—Feminine Hygiene—Multiple acquisition time without pressure) evaluates the speed at which the absorbent core absorbs blood. Synthetic menstrual fluid (dose adjusted according to size) is delivered in a transparent funnel that allows the operator to measure how long it takes the sanitary towels to completely absorb the dose (T1). After a while, the same measurement is repeated (twice: T2 and T3). The test liquid used is artificial blood as formulated or prepared by SGS Courtray Laboratories (Oignies, France). This liquid has a viscosity of 7-8 cPa (Target 7.5 cPA) measured at a temperature of 21° C. using a falling ball type viscosimeter (Category number V-2200, size 2, K value 3.3) with a glass ball.

Peak Bending Stiffness Method

The purpose of this test is to measure the peak bending stiffness of a sample, e.g. a napkin, by performing the modified Circular Bending Procedure (based on ASTM D 4032-82). This procedure is a simultaneous multidirectional deformation of a material in which one face of the sample becomes concave while the other face becomes convex. This gives a force value related to flexure-resistance, simultaneously averaging stiffness in all directions.

1. Material

Tensile tester
    Talcum powder
    Ruler
    A smooth-polished steel plate platform with dimensions 102×102×11 mm and made with an 18.75 mm diameter orifice in the centre. The lap edge of the orifice is at a 45° angle to a depth of 4.75 mm.
    A plunger with an overall length of 72.2 mm, a diameter of 6.25 mm and a ball nose having a radius of 2.97 mm. The plunger needs to be placed concentric with the orifice and must have equal clearance on all sides.
    Calibration standard for thickness of 15 mm 2. Method Take 5 products.
    Remove the release papers and put some talcum powder on to eliminate stickiness.
    Cut 3 test samples of 37.5×37.5 mm from the first product. Samples must contain all present layers of the product. Make sure that the samples are not folded or bent. Handling of the samples must be kept to a minimum and to the edges to avoid affecting flexural-resistance properties.
    From the four remaining products three samples of 37.5×37.5 mm, identical to the samples cut from the first product, are cut. This gives 3 sets of five identical samples.
    Put the test plate and the plunger on the tensile tester. Use the calibration standard to adjust the tip of the plunger at 15 mm from the top of the plate (in the middle of the orifice).
    Set plunger speed at 50 cm/min.
    Place a sample (topsheet facing upwards) on the plate below the plunger so that the plunger can descend in the middle of the sample.
    The maximum force is recorded.
    Repeat these steps until all samples have been tested.
    Report the 3 averages of each set of five samples: if any of the significantly absorbent portions of the product have the required flexure-resistance, then the product satisfies the parameters of this test. Therefore: flexure-resistance of this product=the greatest of the average peak bending stiffnesses.

EXAMPLE(S)

Figure 3B:
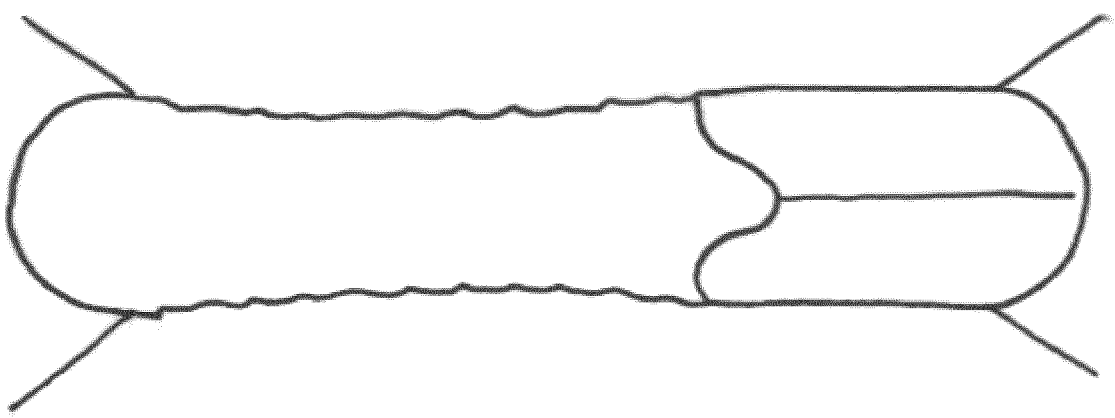
FIG. 3b illustrates another exemplary insert.
Figure 3C:
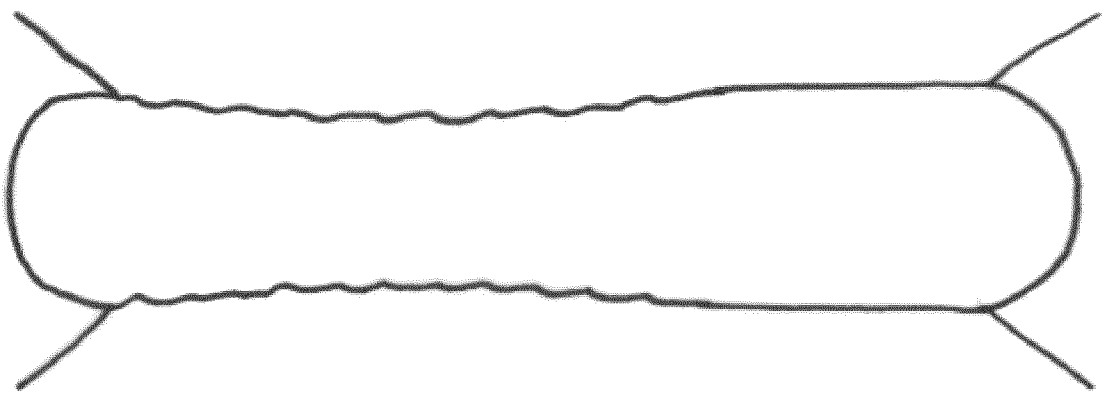
FIG. 3c illustrates another exemplary insert.

Four samples (Ultra Night size) are made, sample A with no inserts, samples B to D with insert types 1 to 3 as illustrated in FIG. 3a to 3c (all other features remaining equal).

Figure 4:
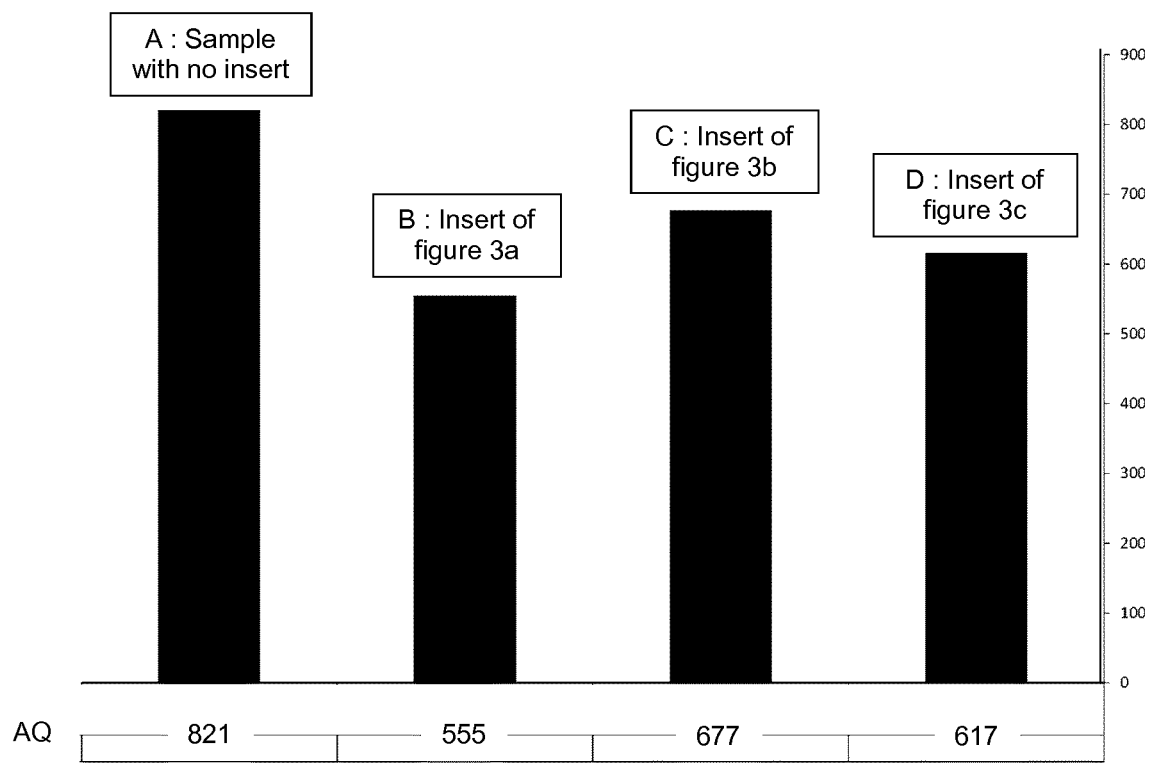
FIG. 4 illustrates the acquisition time (AQ) measured for each of samples A, B, C, and D.

The acquisition time (AQ) is measured for each of the samples according to the "acquisition time method" as defined by SGS Courtray Laboratories and table 1 and FIG. 4 illustrate the results.

TABLE 1

Acquisition time of examples A to D

|  |  | Sample | | | |
| --- | --- | --- | --- | --- | --- |
| Insert |  | A<br>none | B<br>FIG. 3a | C<br>FIG. 3b | D<br>FIG. 3c |
| Acquisition | T1 [s] | 97.5 | 76 | 77.5 | 80.5 |
| Time (without | T2 [s] | 277.5 | 175.5 | 228.5 | 212 |
| pressure) | T3 [s] | 446 | 303.5 | 371 | 324 |
| dose: 3 × 10 cm$^3$ | AQ time [s] =<br>T1 + T2 + T3 | 821 | 555 | 677 | 617 |

As evidenced by these results, the presence of second zones having a lower amount of absorbent material reduce the acquisition time (samples B,C,D vs. sample A). The presence of a v-shaped end as described herein (sample C)

and/or the presence of a cross design in the central portion of the absorbent core as described herein (sample B) further reduce the acquisition time.

Figure 7:
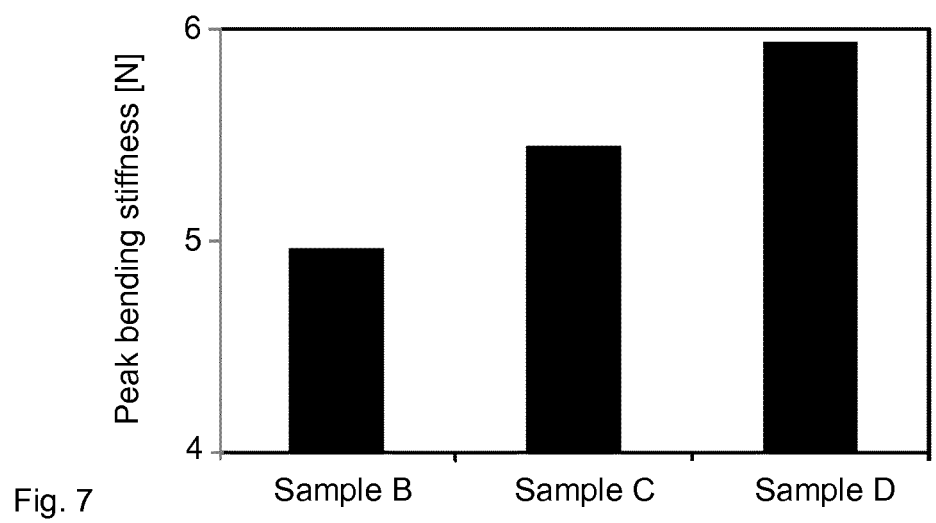
FIG. 7 illustrates the peak bending stiffness (N) of samples B, C, and D.

The peak bending stiffness of samples B, C, D is measured and FIG. 7 illustrate the results of flexure resistance, lower results showing improved body fit. All samples show low flexure resistance, so good comfort. The presence of a v-shaped end as described herein (sample C) and/or the presence of a cross design in the central portion of the absorbent core as described herein (sample B) further reduce the flexure resistance and further improve body fit.

Five other samples (Ultra Super size) are made, sample E with no inserts, samples F to I with insert types 1 to 3 as illustrated in FIG. 3a to 3c, and insert 61 as illustrated in FIG. 6a (all other features remaining equal).

The acquisition time (AQ) is measured for each of the samples according to the "acquisition time method" as defined by SGS Courtray Laboratories and table 2 illustrates the results. The peak bending stiffness of samples E to I is measured and results are also shown in Table 2.

TABLE 2

Acquisition time and peak bending stiffness of examples E to I

| | | Sample | | | | |
|---|---|---|---|---|---|---|
| | | E | F | G | H | I |
| Insert | | none | FIG. 3a | FIG. 3b | FIG. 3c | FIG. 6a |
| Acquisition Time (without pressure) Dose: 3 × 7 cm³ | T1 [s] | 49.5 | 46.5 | 46.5 | 54 | 45.5 |
| | T2 [s] | 98 | 85 | 91.5 | 91 | 82.5 |
| | T3 [s] | 151.5 | 126.5 | 162.5 | 145.5 | 141.5 |
| | AQ time [s] = T1 + T2 + T3 | 299 | 258 | 301 | 291 | 270 |
| Peak bending stiffness | [N] | 4.95 | 3.47 | 4.5 | 3.91 | 3.14 |

Although samples A to D cannot be compared with samples E to I (different size, different dose, different ADL, . . . ), samples E to I can be compared, as only the insert changes. As evidenced by these results, the presence of second zones having a lower amount of absorbent material generally reduce the acquisition time and improves body fit.

Sample I, in particular, shows an excellent combination of low acquisition time (low total acquisition time and lowest T1) and lowest stiffness.

The invention claimed is:

1. An absorbent core for an absorbent article comprising an absorbent material, the absorbent core comprising one or more first zones comprising a first amount of absorbent material and one or more second zones comprising a second amount of absorbent material, wherein each second zone is at least partly delimited by at least one of the one or more first zones characterized in that the first amount of absorbent material is different than the second amount of absorbent material, each amount of absorbent material being determined as weight per unit area, wherein the one or more second zones form a pattern which is symmetrical with respect to a central longitudinal axis of the absorbent core, wherein the absorbent core comprises two end portions and a central portion therebetween extending parallel to the central longitudinal axis of the absorbent core, and wherein at least two second zones converge to one point proximal to at least one end portion such to form at least one v-shaped end, and wherein at least two second zones cross each other at a point of the central portion of the absorbent core, and wherein a ratio of the second amount of absorbent material within a second zone to the first amount of absorbent material within neighbouring one or more first zones is between 0 and 1, and wherein the absorbent material of the one or more second zones has a second density which is lower than a first density of the absorbent material of the one or more first zones.

2. An absorbent core for an absorbent article comprising an absorbent material, the absorbent core comprising one or more first zones comprising a first amount of absorbent material and one or more second zones comprising a second amount of absorbent material, wherein each second zone is at least partly delimited by at least one of the one or more first zones characterized in that the first amount of absorbent material is different than the second amount of absorbent material, each amount of absorbent material being determined as weight per unit area, wherein the one or more second zones form a pattern which is symmetrical with respect to a central longitudinal axis of the absorbent core, wherein the absorbent core comprises two end portions and a central portion therebetween extending parallel to the central longitudinal axis of the absorbent core, and wherein at least two second zones cross each other at a point of the central portion of the absorbent core, and wherein a ratio of the second amount of absorbent material within a second zone to the first amount of absorbent material within neighbouring one or more first zones is between 0 and 1, and wherein the absorbent material of the one or more second zones has a second density which is lower than a first density of the absorbent material of the one or more first zones.

3. The absorbent core according to claim 1 wherein the one or more second zones are in the form of one or more continuous or discontinuous lines.

4. The absorbent core according to claim 1 wherein at least two second zones extend along and substantially parallel to said central longitudinal axis at opposing and distal sides thereof.

5. The absorbent core according to claim 1 wherein at least two second zones converge to one point proximal to both said end portions such to form two v-shaped ends.

6. The absorbent core according to claim 1 wherein at least two second zones run parallel along said central portion and further converge to one point proximal to at least one said end portions such to form one or two v-shaped ends, wherein the at least two second zones are interconnected by one or more further second zones, and/or one or more third zones comprising a third amount of absorbent material, the third amount of absorbent material being different from the first amount of absorbent material and/or second amount of absorbent material, the one or more further second zones and/or one or more third zones extending along the central transverse axis.

7. The absorbent core according to claim 1 wherein the one or more second zones are in the form of channels, folding-lines, or combinations thereof.

8. An absorbent article selected from the group consisting of diapers, adult incontinence briefs, training pants, diaper holders, liners, sanitary napkins, surgical bandages, sponges, and combinations thereof, comprising an absorbent core according to claim 1.

9. An absorbent article selected from the group consisting of diapers, adult incontinence briefs, training pants, diaper holders, liners, sanitary napkins, surgical bandages, sponges, and combinations thereof, comprising an absorbent core according to claim 2.

10. The absorbent core according to claim 2 wherein the one or more second zones are in the form of one or more continuous or discontinuous lines.

11. The absorbent core according to claim 2 wherein at least two second zones extend along and substantially parallel to said central longitudinal axis at opposing and distal sides thereof.

12. The absorbent core according to claim 2 wherein at least two second zones converge to one point proximal to both said end portions such to form two v-shaped ends.

13. The absorbent core according to claim 2 wherein the one or more second zones are in the form of channels, folding-lines, or combinations thereof.

14. The absorbent core according to claim 1 wherein the one or more second zones form a pattern which is symmetrical with respect to a central transverse axis of the absorbent core.

15. The absorbent core according to claim 2 wherein the one or more second zones form a pattern which is symmetrical with respect to a central transverse axis of the absorbent core.

* * * * *